United States Patent
Hu et al.

(10) Patent No.: US 11,164,369 B2
(45) Date of Patent: Nov. 2, 2021

(54) METHODS AND SYSTEMS FOR CONSTRUCTING MAP DATA USING POISSON SURFACE RECONSTRUCTION

(71) Applicant: Argo AI, LLC, Pittsburgh, PA (US)

(72) Inventors: Xiaoyan Hu, San Jose, CA (US); Michael Happold, Pittsburgh, PA (US); Joshua Max Manela, West Bloomfield, MI (US); Guy Hotson, Mountain View, CA (US)

(73) Assignee: Argo AI, LLC, Pittsburgh, PA (US)

( * ) Notice: Subject to any disclaimer, the term of this patent is extended or adjusted under 35 U.S.C. 154(b) by 11 days.

(21) Appl. No.: 16/722,641

(22) Filed: Dec. 20, 2019

(65) Prior Publication Data

US 2021/0192841 A1 Jun. 24, 2021

(51) Int. Cl.
| | | |
|---|---|---|
| *G06T 15/00* | (2011.01) | |
| *G06T 17/05* | (2011.01) | |
| *G06T 17/20* | (2006.01) | |
| *G06T 5/00* | (2006.01) | |
| *G05D 1/00* | (2006.01) | |
| *G01S 13/89* | (2006.01) | |
| *G05D 1/02* | (2020.01) | |
| *G01S 17/89* | (2020.01) | |
| *B60W 60/00* | (2020.01) | |

(52) U.S. Cl.
CPC .............. *G06T 17/05* (2013.01); *G01S 13/89* (2013.01); *G01S 17/89* (2013.01); *G05D 1/0088* (2013.01); *G05D 1/0214* (2013.01); *G06T 5/005* (2013.01); *G06T 17/20* (2013.01); *B60W 60/001* (2020.02); *G05D 2201/0213* (2013.01); *G06T 2210/56* (2013.01)

(58) Field of Classification Search
CPC ......... G06T 19/00; G06T 17/20; G06T 17/00; G06T 15/10; G06T 15/00
USPC .......................................................... 345/419
See application file for complete search history.

(56) References Cited

U.S. PATENT DOCUMENTS

| | | | |
|---|---|---|---|
| 8,239,175 B2 | 8/2012 | Wivell et al. | |
| 9,245,382 B2 | 1/2016 | Zhou et al. | |
| 9,659,408 B2 | 5/2017 | Robert et al. | |
| 2008/0004517 A1* | 1/2008 | Bhandarkar | G06T 7/33 600/407 |
| 2014/0368498 A1* | 12/2014 | Wei | G06T 17/205 345/420 |

(Continued)

OTHER PUBLICATIONS

Newcombe, Richard A. et al., "KinectFusion: Real-Time Dense Surface Mapping and Tracking", 2011 10th IEEE International Symposium on Mixed and Augmented Reality, IEEE, Oct. 26-29, 2011.

(Continued)

*Primary Examiner* — Gordon G Liu
(74) *Attorney, Agent, or Firm* — Fox Rothschild LLP

(57) ABSTRACT

A method and a system for generating a mesh representation of a surface. The method includes receiving a three-dimensional (3D) point cloud representing the surface, identifying and discarding one or more outliers in the 3D point cloud to generate a filtered point cloud using a Gaussian process, adding one or more additional points to the filtered point cloud to generate a reconstruction dataset, and using Poisson surface reconstruction to generate an implicit surface corresponding to the surface from the reconstruction dataset.

33 Claims, 10 Drawing Sheets

(56) References Cited

U.S. PATENT DOCUMENTS

| | | | |
|---|---|---|---|
| 2015/0146971 A1* | 5/2015 | Robert | G06T 7/557 |
| | | | 382/154 |
| 2015/0347682 A1* | 12/2015 | Chen | G16H 50/20 |
| | | | 705/2 |
| 2017/0294026 A1 | 10/2017 | Choi et al. | |
| 2018/0130176 A1 | 5/2018 | Castorena Martinez | |
| 2019/0080516 A1 | 3/2019 | Petrovskaya et al. | |
| 2019/0108679 A1 | 4/2019 | Wang et al. | |
| 2019/0152487 A1 | 5/2019 | Tokuhiro et al. | |
| 2019/0278293 A1* | 9/2019 | Levinson | G05D 1/0251 |

OTHER PUBLICATIONS

McCool, Chris et al., "Normalisation of 3D Face Data," 1st International Conference on Signal Processing and Communication System, Dec. 18, 2007 pp. 1-7, pp. 1-4 and Figure 5.

\* cited by examiner

METHODS AND SYSTEMS FOR CONSTRUCTING MAP DATA USING POISSON SURFACE RECONSTRUCTION

BACKGROUND

Understanding environments is one of the fundamental problems for intelligent robots such as autonomous vehicles to perform dependable tasks. For example, if an environmental map is erroneous, an autonomous vehicle may hit obstacles or lose track of its poses during navigation.

To model an environment, three-dimensional (3D) scanners (e.g., laser scanners) are often used to obtain a set of vertices in a 3D coordinate system (referred to as a point cloud). Recent advances in 3D scanning technologies have made the fast acquisition of dense and accurate point cloud data possible with moderate costs. Surface reconstruction transforms a 3D point cloud into a continuous and scalable surface representation. For navigation and control of an autonomous vehicle, surface reconstruction may be used to create a map or model of the ground surface (i.e., ground surface reconstruction).

Ground surface reconstruction may be achieved by creating mesh models from point clouds, the point clouds being generated through the extraction from sensor data such as data obtained from ground reconnaissance video or active sensors like light detection and ranging (LIDAR) data or similar techniques. A mesh model represents an object, terrain or other surface as a series of interconnected planar shapes, such as sets of triangles, quadrangles or more complex polygons. Due to lower point density of point clouds from LIDAR data, mesh models generated based on LIDAR data do not have enough detail and are often not textured. Moreover, these techniques are unable to handle ground surfaces on which there is missing LIDAR data (occlusions) regarding the ground surface.

This document describes methods and systems that are directed to addressing the problems described above, and/or other issues.

SUMMARY

In one or more scenarios, systems and methods for generating a mesh representation of a surface is disclosed. The system may include one or more mapping sensors, a processor, and a non-transitory computer readable medium comprising one or more programming instructions. The system may be configured to receive a three-dimensional (3D) point cloud representing the surface, identify and discard one or more outliers in the 3D point cloud to generate a filtered point cloud using a Gaussian process, add one or more additional points to the filtered point cloud to generate a reconstruction dataset, and use Poisson surface reconstruction to generate an implicit surface corresponding to the surface from the reconstruction dataset.

In one or more scenarios, the system may also extract a polygon mesh representation of the surface using the implicit surface. Optionally, the system may use the polygon mesh representation for navigating an autonomous vehicle over the surface. In certain embodiments, the polygon mesh representation may be a triangle mesh representation. Generating the polygon mesh representation may include using a marching cube algorithm, a marching tetrahedrons algorithm, and/or a Bloomenthal Polygonizer. Optionally, generating the polygon mesh representation may include using a fine-to-coarse hash map during polygon mesh extraction for building polygons at a highest resolution first followed by progressively coarser resolution polygons. Additionally and/or alternatively, generating the polygon mesh representation may also include detecting and filling holes in the polygon mesh representation by generating a list of edges that may include a plurality of edges which have been used once in the polygon mesh and building polygons starting from a first vertex in the implicit surface using the list of edges until reaching the first vertex such that each of the plurality of edges is used twice in the polygon mesh.

In certain scenarios, identifying and discarding the one or more outliers in the 3D point cloud to generate the filtered point cloud using the Gaussian process may include identifying a Gaussian surface corresponding to the 3D point cloud, determining a mean Gaussian surface from the Gaussian surface, identifying the one or more outliers as points in the 3D point cloud that have a standard deviation from the mean Gaussian surface that is greater than a threshold standard deviation.

In certain other scenarios, identifying and discarding the one or more outliers in the 3D point cloud to generate the filtered point cloud using the Gaussian process may include identifying a Gaussian surface corresponding to the 3D point cloud, determining a mean Gaussian surface from the Gaussian surface, and identifying the one or more outliers as points in the 3D point cloud that are located at a physical distance from the mean Gaussian surface that is greater than a threshold physical distance.

Optionally, adding the one or more additional points to the filtered point cloud to generate the reconstruction dataset may include identifying one or more holes in the filtered point cloud, and adding at least one point to each of the one or more holes using a Gaussian surface corresponding to the 3D point cloud. Identifying the one or more holes may include grid-sampling a subset of points in the filtered point cloud to determine whether at least one point of the point cloud exists within a threshold distance from a sampled point, and identifying a hole proximate to the sampled point upon determining that at least one point of the point cloud does not exist within the threshold distance from the sampled point. The system may also add the sampled point to the reconstruction dataset upon determining that least one point of the point cloud exists within the threshold distance from the sampled point.

In certain embodiments, receiving the 3D point cloud representing the surface may include generating the 3D point cloud by mapping the surface using a mapping sensor to generate sensor data and using the sensor data for generating the 3D point cloud.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to." Definitions for additional terms that are relevant to this document are included at the end of this Detailed Description.

An autonomous vehicle operating on a road may rely on identifying the ground surface for localization and to determine a safe trajectory for navigation. The autonomous vehicle may also identify one or more features or properties of the ground surface (e.g., contours, vegetation, bumps, holes, uphill, downhill, curve, straight, curbs, road edges, etc.) for a safe control and navigation strategy. The methods and systems of the present disclosure may be used to perform ground surface reconstruction to and use the generated surface model for maneuvering the autonomous vehicle.

Figure 1:
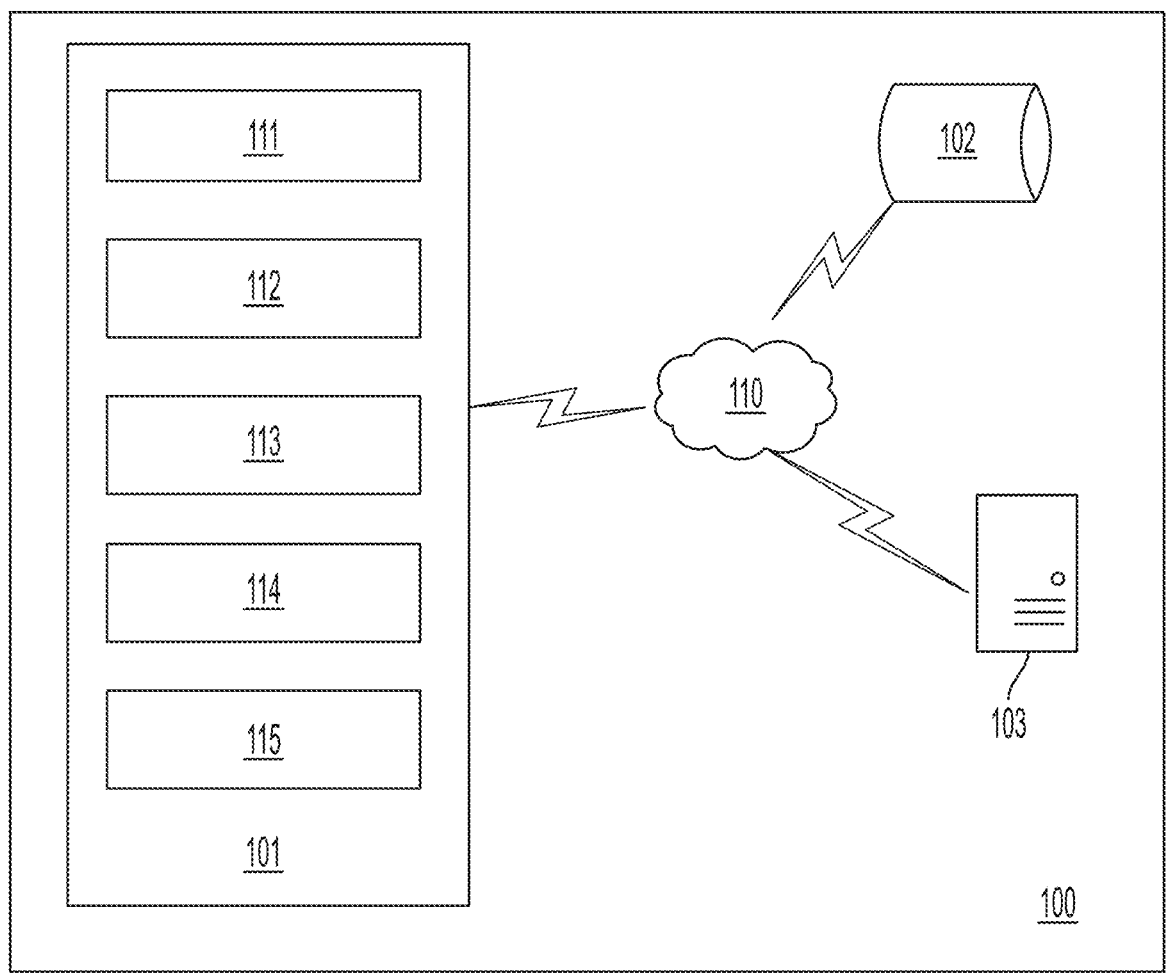
FIG. 1 illustrates an example system that includes an autonomous vehicle.

FIG. 1 is a block diagram illustrating an example system 100 that includes an autonomous vehicle 101 in communication with one or more data stores 102 and/or one or more servers 103 via a network 110. Although there is one autonomous vehicle shown, multiple autonomous vehicles may be coupled to each other and/or coupled to data stores 102 and/or servers 103 over network 110. Network 110 may be any type of network such as a local area network (LAN), a wide area network (WAN) such as the Internet, a cellular network, a satellite network, or a combination thereof, and may be wired or wireless. Data store(s) 102 may be any kind of data stores such as, without limitation, map data store(s), traffic information data store(s), user information data store (s), point of interest data store(s), or any other type of content data store(s). Server(s) 103 may be any kind of servers or a cluster of servers, such as, without limitation, Web or cloud servers, application servers, backend servers, or a combination thereof.

As illustrated in FIG. 1, the autonomous vehicle 101 may include a sensor system 111, a vehicle controller 112, a vehicle control system 113, a communications interface 114, and a user interface 115. Autonomous vehicle 101 may further include certain components (not shown here) included in vehicles, such as, an engine, wheels, steering wheel, transmission, etc., which may be controlled by vehicle control system 112 using a variety of communication signals and/or commands, such as, for example, acceleration signals or commands, deceleration signals or commands, steering signals or commands, braking signals or commands, etc.

The sensor system 111 may include one or more sensors that are coupled to and/or are included within the autonomous vehicle 101. Examples of such sensors include, without limitation, a light detection and ranging (LIDAR) system, a radio detection and ranging (RADAR) system, a laser detection and ranging (LADAR) system, a sound navigation and ranging (SONAR) system, one or more cameras (e.g., visible spectrum cameras, infrared cameras, etc.), temperature sensors, position sensors (e.g., global positioning system (GPS), etc.), location sensors, fuel sensors, motion sensors (e.g., inertial measurement units (IMU), etc.), humidity sensors, occupancy sensors, or the like. The sensor data can include information that describes the location of objects within the surrounding environment of the autonomous vehicle 101, information about the environment itself, information about the motion of the autonomous vehicle 101, information about a route of the autonomous vehicle, or the like. As autonomous vehicle 101 travels over a surface, at least some of the sensors may collect data pertaining to the surface.

For example, the GPS can be used to determine or estimate a geographical location of autonomous vehicle 101. To this end, the GPS may include a transceiver configured to estimate a position of the autonomous vehicle 101 with respect to the Earth, based on satellite-based positioning data. In an example, the system may be configured to use the GPS in combination with the map data to estimate a location of a lane boundary on a road on which the autonomous vehicle 101 may be travelling.

The IMU may be any combination of sensors configured to sense position and orientation changes of the autonomous vehicle 101 based on inertial acceleration. In some examples, the combination of sensors may include, for example, accelerometers and gyroscopes.

The RADAR system may be considered as an object detection system that may be configured to use radio waves to determine characteristics of the object such as range, altitude, direction, or speed of the object. The RADAR system may be configured to transmit pulses of radio waves or microwaves that may bounce off any object in a path of the waves. The object may return a part of energy of the waves to a receiver (e.g., dish or antenna), which may be part of the RADAR system as well. The RADAR system also may be configured to perform digital signal processing of received signals (bouncing off the object) and may be configured to identify the object. The received signals or RADAR-based information may be indicative, for example, of dimensional characteristics of a given surface.

The LIDAR system may include a sensor configured to sense or detect objects in an environment in which the autonomous vehicle 101 is located using light. Generally, LIDAR system is a device that incorporates optical remote sensing technology that can measure distance to, or other properties of, a target (e.g., a ground surface) by illuminating the target with light. As an example, the LIDAR system may include a laser source and/or laser scanner configured to emit laser pulses and a detector configured to receive reflections of the laser pulses. For example, the LIDAR system may include a laser range finder reflected by a rotating mirror, and the laser is scanned around a scene being digitized, in one, two, or more dimensions, gathering distance measurements at specified angle intervals. The LIDAR system, for example, may be configured to emit laser pulses as a beam, and scan the beam to generate two dimensional or three dimensional range matrices. In an example, the range matrices may be used to determine distance to a given vehicle or surface by measuring time delay between transmission of a pulse and detection of a respective reflected signal. In some examples, more than one LIDAR system may be coupled to the first vehicle to scan a complete 360° horizon of the first vehicle. The LIDAR system may be configured to provide to the computing device a cloud of point data representing the surface(s), which have been hit by the laser, on the road. The points may be represented by the LIDAR system in terms of azimuth and elevation angles, in addition to range, which can be converted to (X, Y, Z) point data relative to a local coordinate frame attached to the vehicle. Additionally, the LIDAR may be configured to provide intensity values of the light or laser reflected off the surfaces the road that may be indicative of a surface type. In examples, the LIDAR system may include components such as light (e.g., laser) source, scanner and optics, photo-detector and receiver electronics, and position and navigation system. In an example, The LIDAR system may be configured to use ultraviolet (UV), visible, or infrared light to image objects and can be used with a wide range of targets, including non-metallic objects. In one example, a narrow laser beam can be used to map physical features of an object with high resolution.

A camera may be any camera (e.g., a still camera, a video camera, etc.) configured to capture images of the environment in which the autonomous vehicle 101 is located. The cameras can be used to collect other details of the objects that other sensors cannot sense. In addition, a pair of cameras can be used to determine distance from the cameras to the surface over which autonomous vehicle 101 is travelling using methods such as triangulation.

It should be noted that the sensors for collecting data pertaining to the surface may be included in systems other than the autonomous vehicle 101 such as, without limitation, other vehicles (autonomous or driven), ground or aerial survey systems, satellites, aerial mounted cameras, infrared sensing devices, other robots, machines, or the like.

Figure 2:
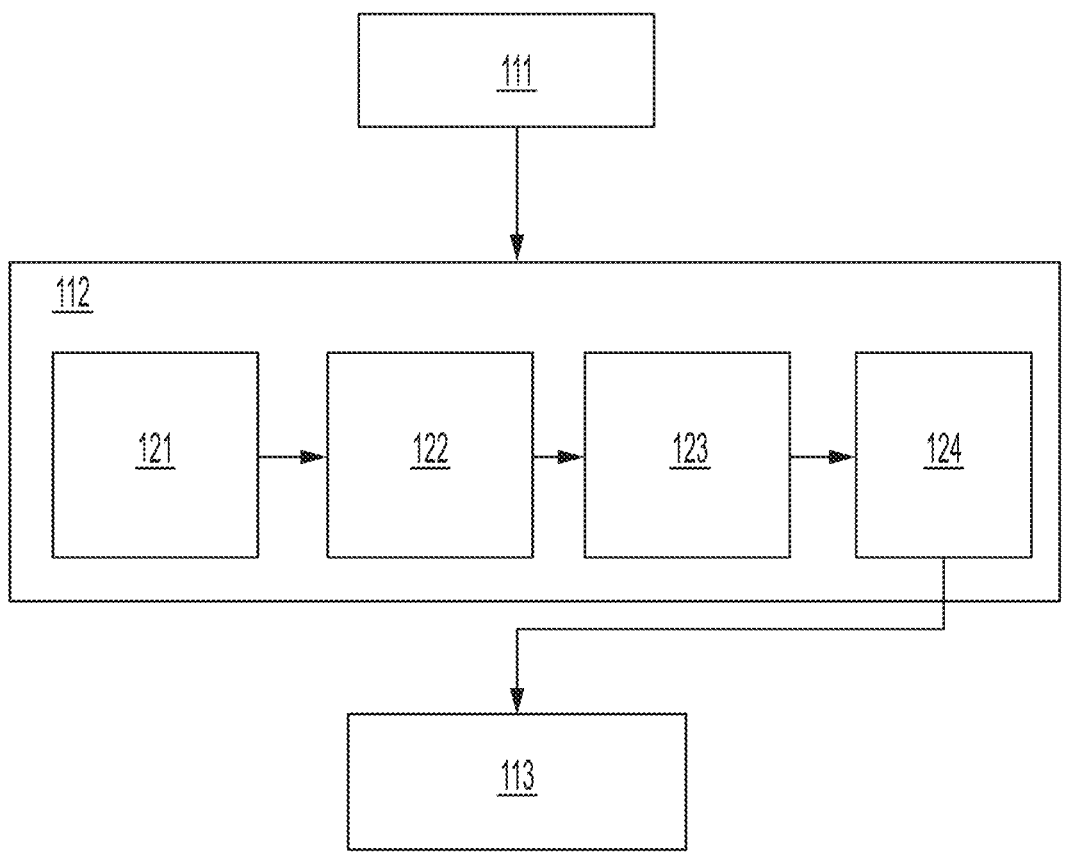
FIG. 2 illustrates a block diagram of various components of an example controller of an autonomous vehicle.

Referring now to FIG. 2, the vehicle controller 112 may receive data collected by the sensor system 111 and analyze it to provide one or more vehicle control instructions to the vehicle control system 113. The vehicle controller 112 may include, without limitation, a location subsystem 121, a perception subsystem 122, a forecasting and prediction subsystem 123, and a motion planning subsystem 124. The components of the vehicle controller 112 (a location subsystem 121, a perception subsystem 122, a forecasting and prediction subsystem 123, and a motion planning subsystem 124) may be a device or a processing device. While the current disclosure shows the components as separate parts of the vehicle controller 112, one or more components may be a included in a single device or processing device.

A location subsystem 121 may obtain, retrieve, and/or create map data that provides detailed information about the surrounding environment of the autonomous vehicle. The map data can provide information regarding: the identity and location of different roadways, road segments, buildings, or other items; the location and directions of traffic lanes (e.g., the location and direction of a parking lane, a turning lane, a bicycle lane, or other lanes within a particular roadway); traffic control data (e.g., the location and instructions of signage, traffic lights, or other traffic control devices); and/or any other map data that provides information that assists the vehicle controller 112 in analyzing the surrounding environment of the autonomous vehicle. In certain embodiments, the map data may also include reference path information that correspond to common patterns of vehicle travel along one or more lanes such that the motion of the object is constrained to the reference path (e.g., locations within traffic lanes on which an object commonly travels). Such reference paths may be pre-defined such as the centerline of the traffic lanes. Optionally, the reference path may be generated based on a historical observations of vehicles or other objects over a period of time (e.g., reference paths for straight line travel, lane merge, a turn, or the like).

The map data may also include, surface details, properties, or features corresponding to one or more regions on a map and generated using the methods described in this disclosure. In certain embodiments, the location subsystem 121 may also determine the terrain or features of a surface on which the autonomous vehicle is currently traveling or will travel using the surface reconstruction methods of this disclosure. It should be noted that the terrain or features of the surface may be determined while an autonomous vehicle is traveling on the surface in real-time or before the autonomous vehicle starts traveling on it (e.g., during a mapping phase) and saved for future use in a data store.

In certain embodiments, the location subsystem 121 may also include and/or may receive information relating to the trip or route of a user, real-time traffic information on the route, or the like.

The location subsystem 121 may include and/or may be in communication with a routing module 121(b) that generates a navigation route from a start position to a destination position for an autonomous vehicle. The routing module 112(b) may access the map data store 112(a) to identify possible routes and road segments that a vehicle can travel on to get from the start position to the destination position. The routing module 112(b) may score the possible routes and identify a preferred route to reach the destination. For example, the routing module 112(b) may generate a navigation route that minimizes Euclidean distance traveled or other cost function during the route, and may further access the traffic information and/or estimates that can affect an amount of time it will take to travel on a particular route. Depending on implementation, the routing module 112(b) may generate one or more routes using various routing methods, such as Dijkstra's algorithm, Bellman-Ford algorithm, or other algorithms. The routing module 112(b) may also use the traffic information to generate a navigation route that reflects expected conditions of the route (e.g., current day of the week or current time of day, etc.), such that a route generated for travel during rush-hour may differ from a route generated for travel late at night. The routing module 112(b) may also generate more than one navigation route to a destination and send more than one of these navigation routes to a user for selection by the user from among various possible routes.

A perception subsystem 122 may determine perception information of the surrounding environment of the autonomous vehicle. Based on the sensor data provided by sensor system 111 and information obtained by the location subsystem 121, the perception subsystem 122 may determine perception information of the surrounding environment of the autonomous vehicle 101. The perception information may represent what an ordinary driver would perceive in the surrounding environment of a vehicle. The perception data may include information relating to one or more objects in the environment of the autonomous vehicle 101. For example, the perception subsystem 122 may process sensor data (e.g., LiDAR or RADAR data, camera images, etc.) in order to identify objects and/or features in the environment of autonomous vehicle. The objects may include traffic signals, road way boundaries, other vehicles, pedestrians, and/or obstacles, etc. The perception subsystem 122 may use any now or hereafter known object recognition algorithms, video tracking algorithms, and computer vision algorithms (e.g., track objects frame-to-frame iteratively over a number of time periods) to determine the perception.

In some embodiments, the perception subsystem 122 may also determine, for one or more identified objects in the environment, the current state of the object. The state information may include, without limitation, for each object: current location; current speed and/or acceleration, current heading; current orientation; size/footprint; type (e.g., vehicle vs. pedestrian vs. bicycle vs. static object or obstacle); and/or other state information.

A prediction subsystem 123 may predict future locations, trajectories, and/or actions of one or more objects. For example, the prediction subsystem 123 may predict the future locations, trajectories, and/or actions of the objects based at least in part on perception information (e.g., the state data for each object) received from the perception subsystem 122, the location information received from the location subsystem 121, the sensor data, and/or any other data that describes the past and/or current state of the objects, the autonomous vehicle 101, the surrounding environment, and/or their relationship(s). For example, if an object is a vehicle and the current driving environment includes an intersection, prediction subsystem 123 may predict whether the object will likely move straight forward or make a turn. If the perception data indicates that the intersection has no traffic light, prediction subsystem 123 may also predict whether the vehicle may have to fully stop prior to enter the intersection.

A motion planning subsystem 124 may determine a motion plan for the autonomous vehicle. For example, the motion planning subsystem 124 may determine a motion plan for the autonomous vehicle based on the perception data and/or the prediction data. Specifically, given predictions about the future locations of proximate objects and other perception data, the motion planning subsystem 124 can determine a motion plan for the autonomous vehicle 101 that best navigates the autonomous vehicle 101 relative to the objects at their future locations.

In one or more embodiments, the motion planning subsystem 124 may receive the predictions from the prediction and forecasting subsystem 123 and make a decision regarding how to handle objects in the environment of the autonomous vehicle 101. For example, for a particular object (e.g., a vehicle with a given speed, direction, turning angle, etc.), motion planning subsystem 124 decides whether to overtake, yield, stop, and/or pass based on, for example, traffic conditions, map data, state of the autonomous vehicle, etc. Furthermore, the motion planning subsystem also plans a path for the autonomous vehicle 101 to travel on a given route, as well as driving parameters (e.g., distance, speed, and/or turning angle). That is, for a given object, the motion planning subsystem 124 decides what to do with the object and determines how to do it. For example, for a given object, the motion planning subsystem 124 may decide to pass the object and may determine whether to pass on the left side or right side of the object (including motion parameters such as speed). The motion planning subsystem 124 may also assess the risk of a collision between a detected object and the autonomous vehicle 101. If the risk exceeds an acceptable threshold, it may determine whether the collision can be avoided if the autonomous vehicle follows a defined vehicle trajectory and/or implements one or more dynamically generated emergency maneuvers is performed in a pre-defined time period (e.g., N milliseconds). If the collision can be avoided, then the controller 120 may transmit appropriate control instructions to the vehicle control system 113 for execution to perform a cautious maneuver (e.g., mildly slow down, accelerate, change lane, or swerve). In contrast, if the collision cannot be avoided, then the controller 120 may transmit appropriate control instructions to the vehicle control system 113 for execution of an emergency maneuver (e.g., brake and/or change direction of travel).

As discussed above, planning and control data regarding the movement of the autonomous vehicle is generated by the motion planning subsystem 124 of the controller 120 that is transmitted to the vehicle control system 113 for execution. The vehicle control system 113 may, for example, control braking via a brake controller; direction via a steering controller; speed and acceleration via a throttle controller (in a gas-powered vehicle) or a motor speed controller (such as a current level controller in an electric vehicle); a differential gear controller (in vehicles with transmissions); and/or other controllers.

In the various embodiments discussed in this document, the description may state that the vehicle or a controller included in the vehicle (e.g., in an on-board computing system) may implement programming instructions that cause the controller to make decisions and use the decisions to control operations of one or more vehicle systems via the vehicle control system of the vehicle. However, the embodiments are not limited to this arrangement, as in various embodiments the analysis, decision making and or operational control may be handled in full or in part by other computing devices that are in electronic communication with the vehicle's on-board controller and/or vehicle control system. Examples of such other computing devices include an electronic device (such as a smartphone) associated with a person who is riding in the vehicle, as well as a remote server that is in electronic communication with the vehicle via a wireless communication network. The processor of any such device may perform the operations that will be discussed below. For e.g., the surface construction of the current disclosure may be performed, at least in part, by a computing devices that are in electronic communication with the vehicle's on-board controller and/or vehicle control system based on data collected by the sensors.

Referring back to FIG. 1, the communications interface 114 may be configured to allow communication between autonomous vehicle 101 and external systems, such as, for example, external devices, sensors, other vehicles, servers, data stores, databases etc. Communications interface 114 may utilize any now or hereafter known protocols, protection schemes, encodings, formats, packaging, etc. such as, without limitation, Wi-Fi, an infrared link, Bluetooth, etc. User interface system 113 may be part of peripheral devices implemented within vehicle 101 including, for example, a keyword, a touch screen display device, a microphone, and a speaker, etc.

Figure 3:
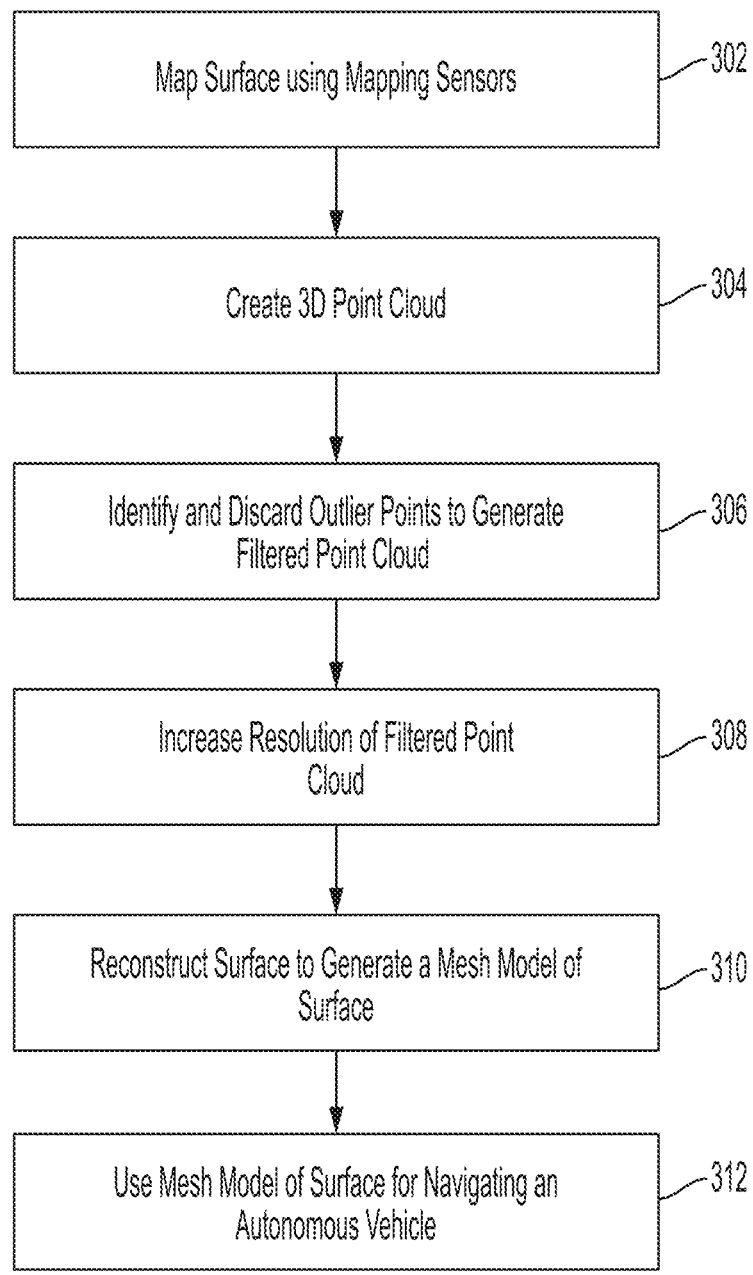
FIG. 3 illustrates a flowchart of an example method for modeling a surface using surface reconstruction.

Referring now to FIG. 3, a flowchart illustrating an example method for generating a model of a surface via surface reconstruction and using data obtained from one or more sensors is shown. An accurate geometric model of the surface (e.g., a road surface) may be used for localization and navigation of an autonomous vehicle while respecting the geometric and temporal constraints of the surface.

At 302, the surface to be modeled may be mapped using one or more mapping sensor to collect sensor data corresponding to the surface. For example, one or more sensors mounted in an autonomous vehicle may be used to map the surface while the autonomous vehicle travels in proximity of the surface (e.g., travels over the surface of a road to be reconstructed). The surface may also be mapped by systems including mapping sensors such as the autonomous vehicle itself, other vehicles, satellites, robots, machines, aerial mapping systems, or the like.

Examples of mapping sensors may include, without limitation, GPS, IMUS, RADAR systems, LIDAR systems, SONAR systems, LADAR systems, cameras, etc. It should be noted that more than one type of sensor may be used to map the surface and collect sensor data, including various kinds of laser scanning, radar, and GPS surveying, each having different measuring characteristics.

In one embodiment of the present disclosure, the surface may be mapped and sensor data may be collected by placing the mapping sensor at a fixed pose. A pose of the mapping sensor includes 3 degree-of-freedom translation (position) and 3 degree-of-freedom rotation (orientation), having a total of 6 degrees of freedom. In this case, the point data are acquired as a single frame (e.g. as a depth image) at the fixed pose, and the 3D point cloud is generated by the single frame of the point data. In another embodiment, the surface may be mapped and sensor data may be collected by moving the mapping sensor at different poses, acquiring multiple frames of the point data at the different poses, and registering the multiple frames with each other into a single common coordinate system (or a predetermined single coordinate system) by estimating the different poses of the multiple frames. Such registration can be done by using simultaneous localization and mapping (SLAM) techniques as known in the art. However, as with any physical system, both systematic and random errors may be present in the derived pose of the mapping sensor, requiring subsequent alignment of such scans using any now or hereafter known methods.

At step 304, sensor data collected by the mapping sensors may be used to create a 3D point cloud representing the surface to be modeled. Any now or hereafter known methods may used to create the 3D point cloud from sensor data. For example, data collected by the mapping sensors may be analyzed using one or more processing steps such as sampling, segmentation (to identify points belonging to the surface only), semantic labeling, alignment (local and/or global), filtering (e.g., using a neural network filter), and/or the like, to create the 3D point cloud data corresponding to the surface to be remodeled.

A point cloud may include a set of vertices in a reference 3D coordinate system, each set of vertices corresponding to location information of a point on the surface. In certain embodiments, the reference coordinate system may be a real world coordinate system such as, for example, a geographical coordinate system. These vertices may be defined by X, Y, and Z coordinates, for example, and may represent contour, features, etc. of the surface to be modeled.

Figure 4:
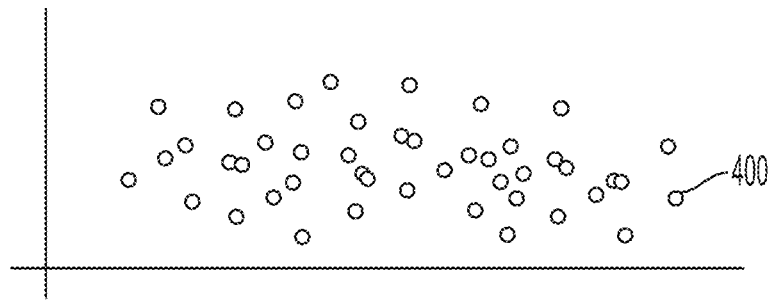
FIG. 4 is a schematic representation of an illustrative point cloud.

FIG. 4 illustrates a schematic representation of an example point cloud 400 corresponding to a surface to be modeled in a 2D graphical format. For example, the point cloud 400 may be a slice of 3D data which can be represented in the 2D format of FIG. 4. As discussed above, the generated point cloud is a 3D point cloud, and the point cloud shown in FIG. 4 is for illustration purposes only.

It should be noted that, in some embodiments, the 3D point cloud may be stored in a data store for future processing (as described below). As such, a system that processes the 3D point cloud may receive a previously created 3D point cloud from the data store. Such a system may or may not be the system that creates the 3D point cloud.

Certain points in the generated 3D point cloud may be outliers, i.e., they do not have correspondence to the surface to be constructed in the real world. Such outlier points may be identified and discarded (step 306) to generate a filtered point cloud having only Gaussian noise.

In one or more embodiments, the outlier points may be identified by fitting a Gaussian surface to the 3D point cloud using a Gaussian process, and using the Gaussian surface as a filter to identify the outlier points. A Gaussian process is a statistical model that can use known values of a random variable provided over a range of times and/or locations to estimate values of the random variable for a specified time and/or location, and provides a framework for learning models of spatially correlated and uncertain data. A machine-learning algorithm that involves a Gaussian process may use lazy learning and a measure of the similarity between points (the kernel function) to predict the value for an unseen point from training data. The prediction is not just an estimate for that point, but also has uncertainty information. Moreover, a Gaussian process may be used to fit a Gaussian surface over the 3D point cloud even in the absence of certain 3D points.

A Gaussian process is a probability distribution across a class of typically smooth functions, which is parameterized by a kernel function k(x, x'), which characterizes the smoothness of the function, f, and a prior mean function m(x).

$$m(x)=E[f(x)],6 \tag{1}$$

kernel function k(x,x') denotes covariance between function values cov [f(x), f(x')]=k(x,x') at points x and x' as follows:

$$k(x,x')=E[(f(x)-m(x))(f(x')-m(x'))], \tag{2}$$

the Gaussian process (GP) is written as:

$$f(x) \sim GP(m(x),k(x,x')). \tag{3}$$

The mean and covariance functions together specify a distribution over functions. In the context of the problem at hand, each x≡(x, y) and f(x)≡z of the given data. The covariance function models the relationship between the random variables which, here, correspond to the given data. Although not necessary, the mean function m(x) may be assumed to be zero by scaling the data appropriately such that it has an empirical mean of zero. There are numerous covariance functions (kernel) that can be used to model the spatial variation between the data points. Therefore, with Gaussian processes, assumptions are made on the shape of the kernel, and the parameters of this kernel are learned from the data during the training stage. As described above, the kernel functions return the covariance between the outputs given the inputs. Examples of the kernel functions may include, without limitation, linear kernel, constant kernel, matern kernel, Gaussian noise kernel, white noise kernel, rational quadratic kernel, piecewise polynomoial kernel, squared-exponential kernel, periodic kernel, neural network kernel, or the like.

In certain embodiments, a neural network kernel may be used because it is not stationary and non-monotonic, and because it can handle di-continuous and rapidly changing data. A neural network kernel, therefore, may be more effective in modeling complex 3D point cloud data. For using a neural network kernel, a Gaussian process model may be trained for a given data set ("training data") to optimize hyperparameters associated with the kernel and to learn the representation of spatial data, using any now or hereafter known methods. This method provides for a non-parametric, probabilistic, multi-scale representation of the data. The trained Gaussian process model may then be used to estimate an implicit Gaussian surface corresponding to the generated 3D point cloud data (corresponding to the surface) at a desired resolution with an appropriate measure of uncertainty for every point in the Gaussian surface. Generation of the Gaussian surface may include performing Gaussian Process Regression of the set of generated 3D point cloud, given the training data set and the GP kernel with the learnt hyperparameters. For example, the training data may be a subset of the 3D point cloud extracted by imposing a regular 2D grid over the X and the Y dimensions of the 3D point cloud, and for each corner of the 2D grid selecting the 3D point whose projection is closest to the corner for inclusion in the training data set.

While the generated Gaussian surface may be a rough surface that may not contain a desired level of detail, it is much more resilient to noise. Therefore, the Gaussian surface may be used as a filter to identify and discard outlier points in the generated 3D point cloud data that do not correspond to the mapped surface. As discussed above, each point is in the Gaussian surface may include an appropriate measure of uncertainty and, therefore, may be tagged with a standard deviation (and/or another measure of uncertainty) from the mean of the rough Gaussian surface. Points on the Gaussian surface that have a standard deviation greater than a threshold standard deviation value may be discarded as outliers. Example threshold standard deviation values may be about 0.5-3.5, about 1-3, about 1.5-2.5, about 1, about 1.5, about 2, about 2.5, or the like. about Alternatively and/or additionally, points on the Gaussian surface that are located at a physical distance greater than a threshold value may be discarded as outliers. Example threshold physical distance values may be about 5-15 cm, about 7-13 cm, about 9-11 cm, about 6 cm, about 8 cm, about 9 cm, about 10 cm, about 11, cm, about 13 cm, about 14 cm, or the like. The threshold values for the standard deviation and/or maximum physical distance may be determined based on, for example, inherent error models of the sensors used, desired smoothness of the reconstructed surface, noise tolerance, desired resolution, desired uncertainty, or the like.

Figure 5A:
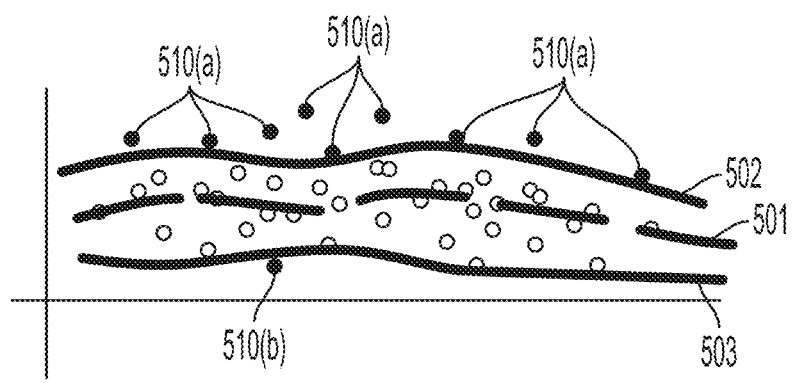
FIG. 5A is a schematic representation of outliers identified using a Gaussian mean surface fitted to the point cloud of FIG. 4.
Figure 5B:
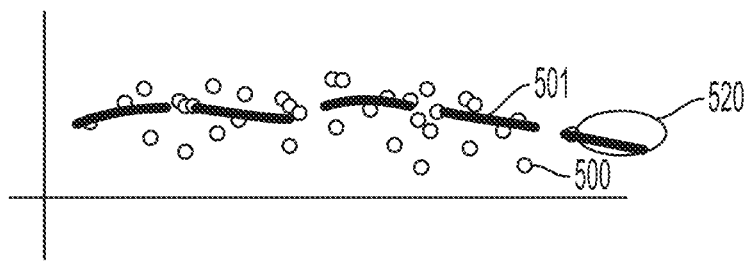
FIG. 5B is a schematic representation of an illustrative filtered point cloud.
Figure 5C:
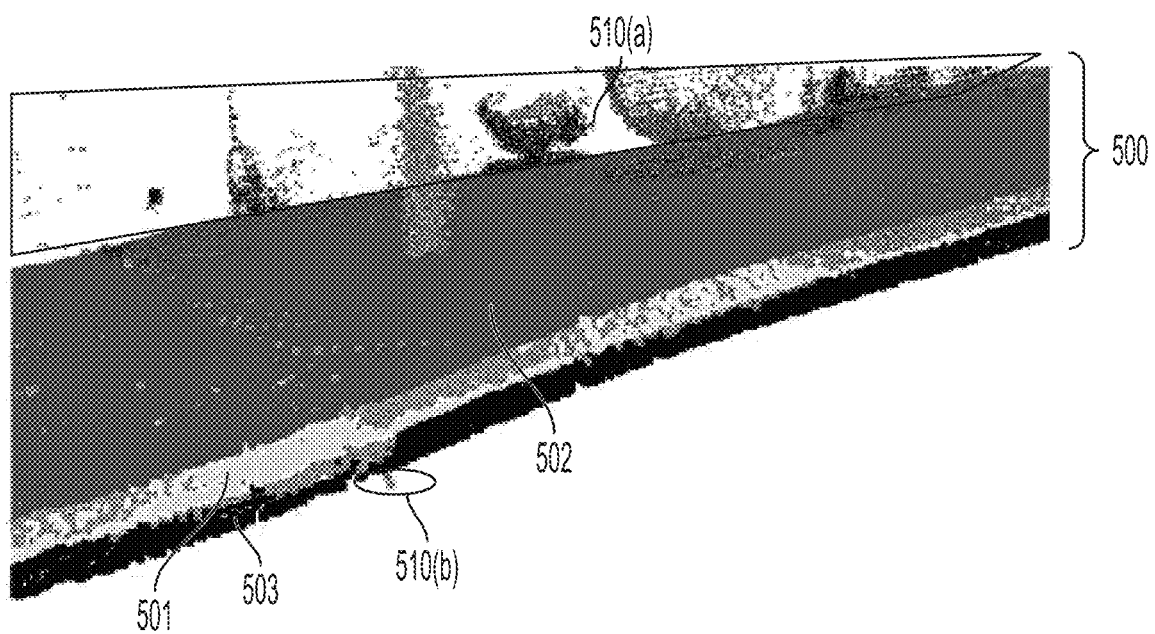
FIG. 5C illustrates outliers identified using a Gaussian mean surface fitted to an example LIDAR point cloud.

FIG. 5A-5B illustrate schematic representations of a Gaussian surface 501 fitted to the point cloud 400 of FIG. 4. As shown in FIG. 5A, outliers 510a and 510b may be identified as points in the point cloud 400 that are located that have a standard deviation greater than a threshold standard deviation value and/or that are located at a physical distance greater than a threshold value from the mean of the Gaussian surface 501 (beyond 502 and/or 503). FIG. 5B illustrates a schematic representation of a filtered point cloud 500 generated using the Gaussian surface 501 after removal of outlier points 510(a) and 510(b). FIG. 5C illustrates an actual point cloud generated based on sensor data collected by mapping a surface. As shown in FIG. 5C, a Gaussian surface is fitted to the point cloud and a mean of the Gaussian surface 501 is determined. Outliers 510(a) are identified as points in the point cloud that lie at a standard deviation greater than a threshold standard deviation (502) above the mean Gaussian surface 501 and outliers 510(b) are identified as points in the point cloud that lie at a standard deviation greater than a threshold standard deviation (503) above the mean Gaussian surface 501.

Additionally and/or alternatively, the outliers may also be identified and discarded using other now or hereafter known methods such as principal component analysis (PCA) models. For example, in certain embodiments, the 3D point cloud data may be subjected to a PCA filter before a Gaussian filter for improving the accuracy of the process. While the current disclosure describes the use of a PCA filter, any now or hereafter known time/frequency domain low pass filters may be used.

PCA is a mathematical process that uses an orthogonal transformation to convert a data set into a set of uncorrelated principal components. In other words, PCA is defined as an orthogonal linear transformation of the data onto a new coordinate system such that the projection of the data onto the first coordinate (called the first principal component) has the largest variance. Likewise, the second principal component (PC), which is orthonormal to the first PC, has a projection with the second largest variance, and this trend persists for all new PC coordinates. PCA may be applied to 3D point cloud data, to separate outliers and noise and points corresponding to the surface. In order to filter the outliers using PCA, the generated 3D point cloud data is mapped onto a new signal subspace that spans only the PC coordinates of interest. After identifying the PC coordinates of interest, a subspace projection operator is formed by matrix multiplication of the PC coordinates of interest with their conjugate transpose. Next the input data matrix is projected onto the projection operator resulting in a filtered output of reduced rank.

At 308, the system may increase the resolution of the filtered point cloud by filling in missing 3D points to generate a dataset for use in surface reconstruction ("SR dataset"). Resolution of a point cloud may be an identification of the level of detail with which features on a surface may be discernible within the point cloud. Point clouds may be used for performing various operations such as, for example, object identification, object classification, scene visualization, segmentation, two-dimensional image data enhancement, and/or other types of operations. The level of performance with which these operations are performed using a point cloud may depend on the resolution of that point cloud. In some cases, resolution of a point cloud may depend on the number of points in the point cloud. For example, as number of points in a point cloud increases, resolution of the point cloud may also increase using the methods and systems of this disclosure.

It should be noted that a sensor may obtain the point data only for portions of a surface that are in the line of sight of the sensor. For example, regions occluded by objects or other obstacles on a surface may not include any 3D points, and such regions cannot be reconstructed without filling in the missing 3D points. For example, when point data corresponding to a ground or road surface is collected by a sensor mounted on an autonomous vehicle, regions underneath other vehicles, pedestrians, etc. may not include any point data. Also, regions corresponding to a slope adjacent to the road surface, a hole in the road, etc. do not include any 3D points since there is no surface that can be measured by the sensor. Furthermore, 3D points may be missing in the 3D point cloud because of sensor limitations of the mapping sensor and/or insufficient mapping. While registering the multiple frames of the point data acquired at the different poses of the 3D sensor reduces the regions of missing 3D points, some regions (e.g., those obscured by an obstacle) cannot be measured at any pose and remain as missing regions. The methods and systems of the current disclosure may be used to fill missing 3D points in these regions and generate a completed 3D point cloud, as discussed below.

In certain embodiments, the missing 3D points may be filled using Gaussian process infilling by sampling points on the Gaussian surface generated in step 306 in regions that have a resolution less than a threshold resolution (i.e., sparse region or hole).

First, the system may identify regions that have a resolution that is less than the desired resolution, i.e., holes. The system may identify such regions by grid-sampling points at centimeter resolution (or any other scale such as mm, micrometer, etc.) across a surface tile in the Gaussian surface. In certain embodiments, the dimensions of the surface tile are in the order of about 10 s of meters. For each sampled point, the system determines if there are any points that are located at a distance greater than a threshold distance (e.g., about 1-10 meter, about 2-9 meters, about 3-8 meters, about 4-7 meters, about 5-6 meters or the like). If the system determines that, for a sampled point, there are one or more points that are located at a distance greater than a threshold distance, the system may determine that there is a hole proximate to the sampled point in one or more directions. For example, as shown in FIG. 5B, region 520 is identified as a hole or sparse region based on the above method. However, if the system determines that, for a sampled point, there are no points that are located at a distance greater than a threshold distance, the system may add the sampled point to the SR dataset.

Once the system has identified the holes or sparse regions, the system may use the Gaussian surface to provide context for interpolation, resampling, and filling of the hole. Specifically, the points surrounding the identified holes on the Gaussian surface may be interpolated to fill the holes using any now or hereafter known methods. A Gaussian process is inherently configured to estimate a parametric function for the environment. Hence, if the input data density is lower than a certain threshold, the system automatically samples the implicit function representative of the Gaussian surface to generate 3D points to fill the gap.

Figure 6A:
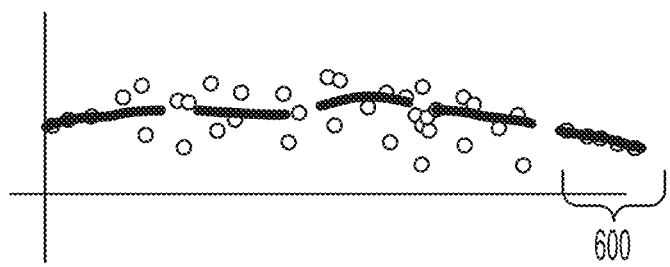
FIG. 6A is a schematic representation of infilling points to the filtered point cloud of FIG. 5B using the Gaussian mean surface.
Figure 6B:
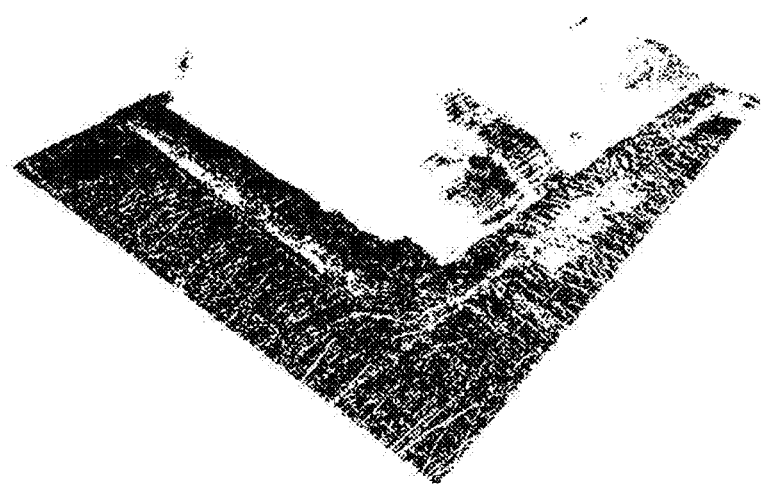
FIGS. 6B and 6C illustrate an example 30m×30 m point cloud tile (generated using LIDAR data) before and after infilling of sparse regions.
Figure 6C:
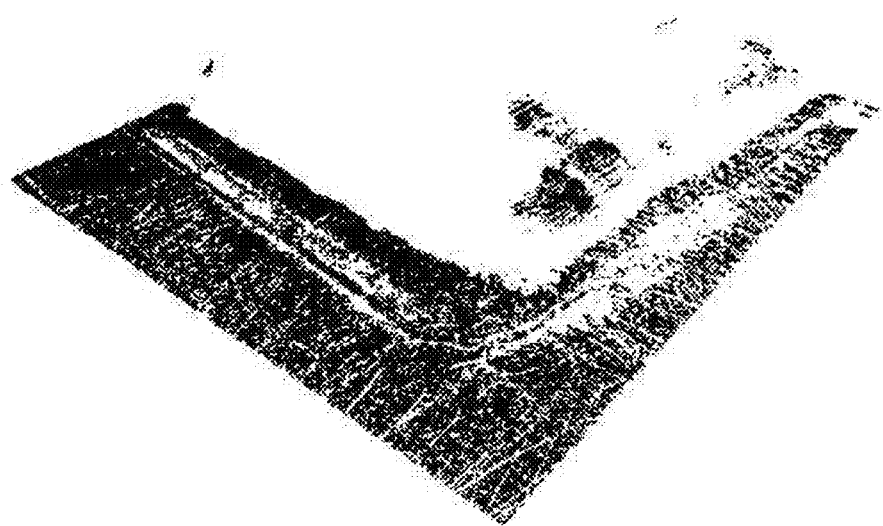

For example, as shown in FIG. 6A, the Gaussian surface may be used to fill points 600 to the previously identified sparse region 520 in the filtered point cloud 500. FIGS. 6B and 6C illustrates an example 30m×30 m point cloud tile (generated using LIDAR data) before and after infilling of sparse regions in the point cloud to add new 3D points, using the methods described in this disclosure.

The system may add the new 3D points to the SR dataset.

Additionally and/or alternatively, other methods for filling sparse regions or holes such as statistical analysis of the generated 3D point cloud, etc. may also be used.

At 310, the system may reconstruct the mapped surface using points in the SR dataset to generate a mesh representation (surface model) of the mapped surface. As part of the mesh generation, the surface reconstruction (e.g., Poisson surface reconstruction or other surface reconstruction method) may be configured to generate a watertight representation of the mapped surface. Watertight means that the mesh used as part of the 3D representation is complete within a perimeter defined by its surfaces and the mesh properly connects to adjacent surfaces around the perimeter so that the volume of the mesh is fully enclosed. As used herein, a watertight 3D representation is a representation in which all, or almost all, of the surface is represented by a contiguous surface.

The system may use any now or hereafter known methods for converting a point cloud to a triangle mesh. In one or more embodiments, the system may first build a multi-resolution octree for the SR dataset, compute an implicit function over the space of the octree, and extract a surface as a watertight triangle mesh. An octree is a tree data structure in which each internal node has eight child nodes, and each node of the octree represents a voxel in which free space and occupied surfaces are encoded. In some embodiments, the Poisson surface reconstruction method may be used for its robustness to noise and tendency to generate watertight meshes, which may effectively estimate a full mapped implicit surface.

In particular, Poisson surface reconstruction is an implicit reconstruction, whose core is to construct a field based on a distance implicit function with positive and negative (hereinafter referred to as distance field). In a given point cloud, each point x in space has a corresponding value f(x) in the field. If x is at outside of the point cloud model, f(x)<0; otherwise, f(x)>0; if f(x)=0, it means the point is on a surface of the point cloud model. The illustrated embodiment obtains sampled points of positions corresponding to f(x)=0 in the space and then connects the sampled points to create surface model. A Poisson equation is used to solve the distance field: for any input point set, an original question is transformed to be solving a Poisson equation and thereby a basis function set based on octree can be obtained. Accordingly, for any point x in space, a corresponding distance implicit functional value f(x) can be rapidly obtained by mixing basis functions. In this manner, the topology of an unknown surface can be inferred given oriented points located on or near the surface and represented as a 3D volume model. The 3D volume model can be used to extract a polygon mesh representation of the unknown surface by constructing a closed surface mesh at f(x)=0 in the distance field. This can be achieved, for example, using the marching cubes algorithm, the marching tetrahedrons algorithm, the Bloomenthal Polygonizer, or any other suitable algorithm for selecting polygons representing portions of the model.

Figure 7A:
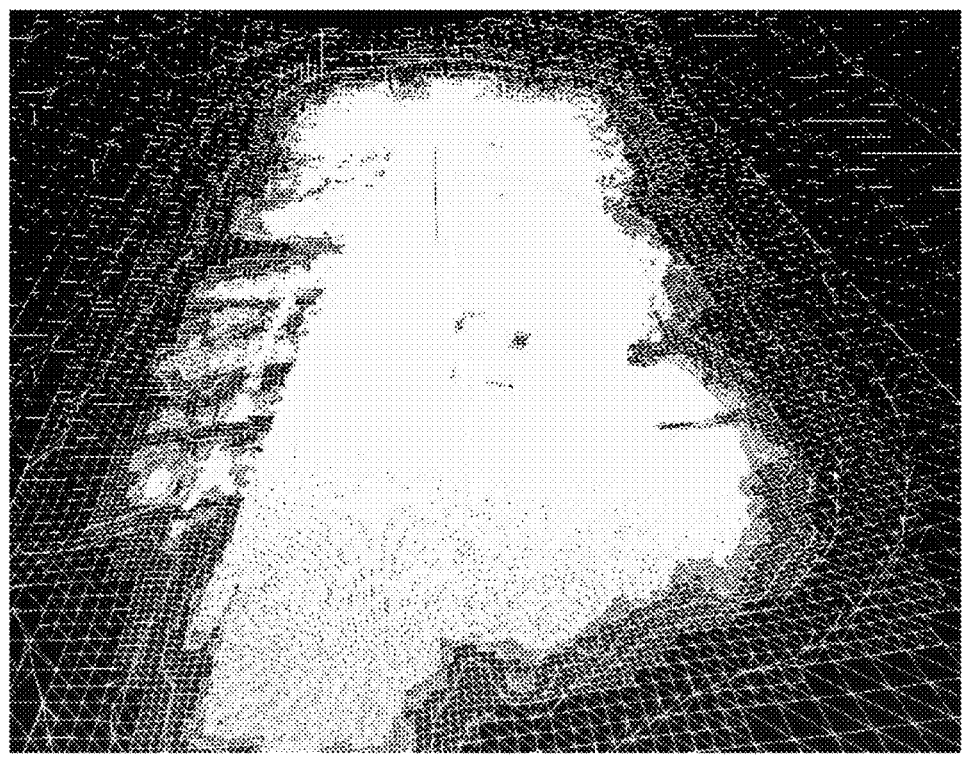
FIG. 7A illustrates a mesh representation generated using prior art methods that includes cracks.

It should be noted that extracting a polygon mesh, using, for example, marching cubes algorithm may produce cracks when scales of neighboring cells differ too much (as shown in FIG. 7A where some triangles are large and some are small representing different scales). This may happen because the generated vertices at finer scales are more accurate than vertices produced at coarser scales leading to a positional difference that results in a crack and/or because finer scale voxels may produce more vertices than their coarser neighbors leading to a difference in quality that results in a crack.

To address the above positional difference problem, the current disclosure utilizes a fine-to-coarse hash map during polygon mesh extraction. Such a hash map includes keys that are edges of voxels and values that are vertex locations. During polygon mesh extraction, the system may build triangles (or other polygons) at finest resolution first and progressively builds triangles on coarser scales. When inserting a new vertex, the system may use the hash map to check if there is a vertex on the same edge (i.e., same resolution or scale as the previous voxel). If such a vertex exists, the system may use the location of such a vertex (derived from the hash map) to build triangles instead of a coarser scale voxel. However, if such a vertex does not exist, the system may use the location of a coarser scale voxel. In this manner, differences between neighboring voxels may be minimized to output a smooth mesh.

Figure 8A:
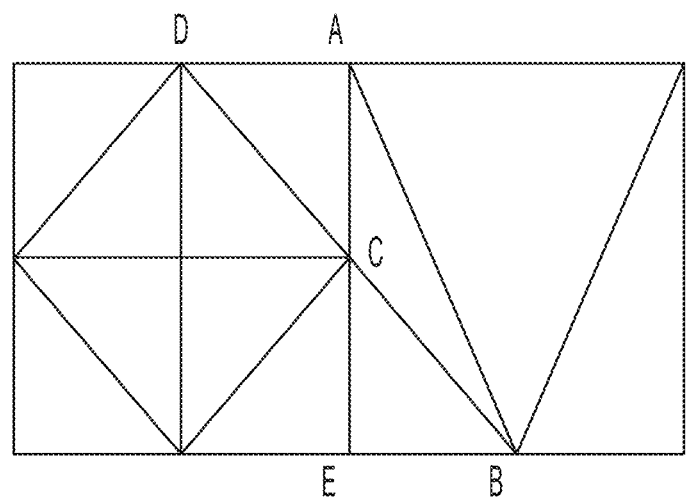
FIG. 8A represents a schematic representation of an example triangle mesh representation.

For example, with respect to the schematic of an example polygon mesh building of FIG. 8A, if the triangle ACB has a coarser resolution compared to the triangle ACD, the system builds the triangle ACD before building the triangle ACB. Furthermore, while traditionally the vertex C is determined by interpolation of A and E resulting in a gap in the final mesh, the system as discussed above uses the lookup table or hash map to identify existing vertices along the edge AE. If such a vertex already exists, the system uses the existing vertex for a polygon instead of interpolation using, for example, marching cubes algorithm.

Figure 8B:
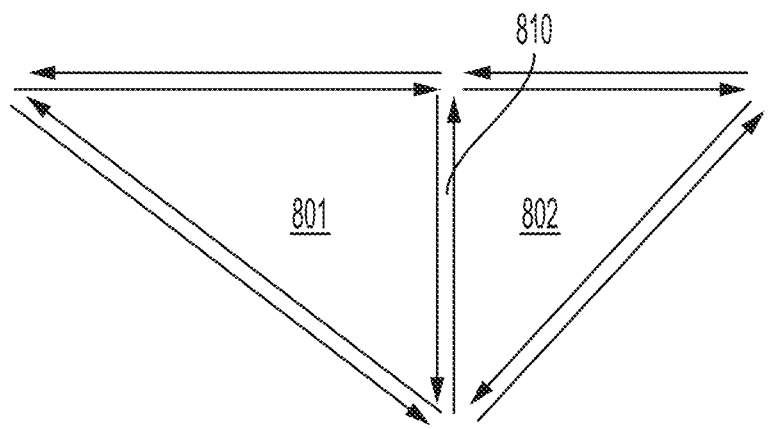
FIG. 8B represents a schematic representation of an example triangle mesh representation in which each edge is used exactly twice.

It should be noted, that for any triangle (or polygon) of a mesh that is topologically hole free, each edge of the triangle has to be used exactly twice—once by the triangle itself and once by its adjacent neighboring triangle. For example, as shown in FIG. 8, edge 810 is used by triangles 801 and 802. Therefore, holes may be detected by counting the number of times edges are used in the mesh building process. Taking this account and to address the quality difference problem, the system may build a list of edges which have been used only once in the resultant mesh and which, therefore, yield holes in the resultant mesh. The system may then start build triangles from a random vertex, continue building triangles using the list of edges until it reaches the starting vertex. The system may continue the process until there is no edge left in the list that has only been used once (i.e., all the edges in the list have been used twice).

Figure 7B:
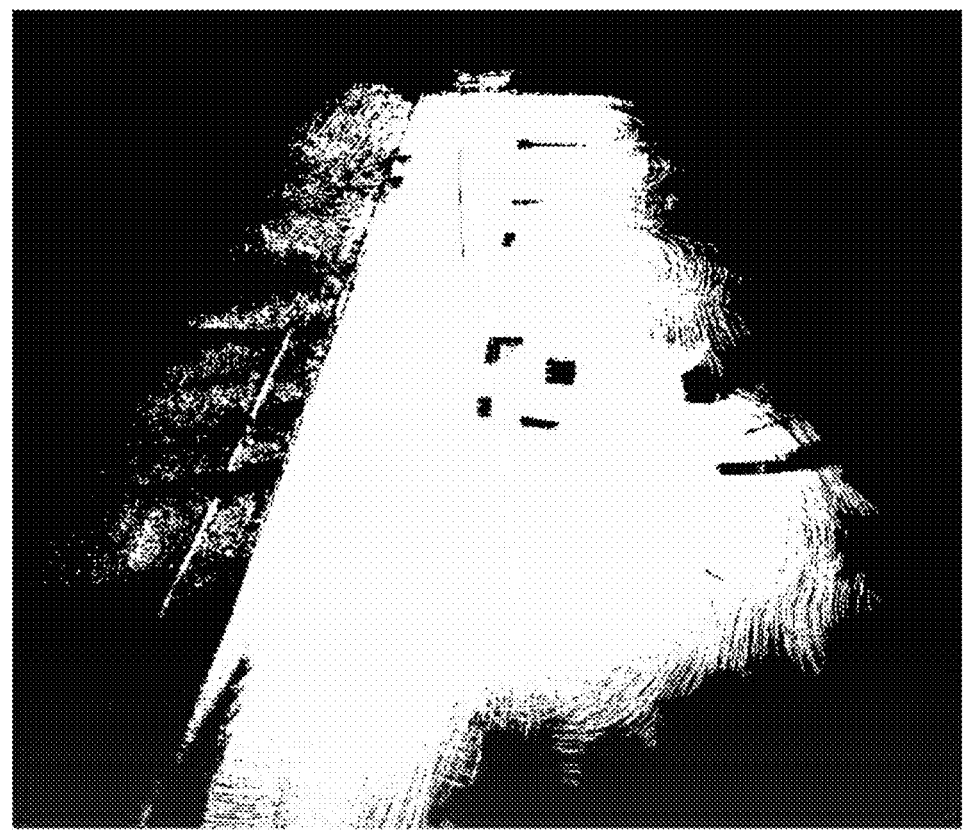
FIG. 7B illustrates a mesh representation generated using systems and methods of this disclosure.
Figure 9:
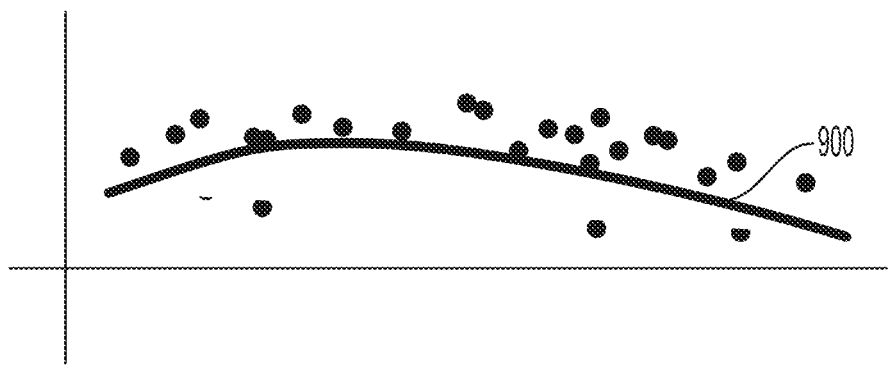
FIG. 9 is a schematic representation of modeled surface generated from the point cloud of FIG. 4.

The system is, therefore, able to build high quality hole free triangle meshes efficiently and effectively from Poisson implicit surface (as shown in FIG. 7B). FIG. 9 illustrates a schematic illustration of a surface model 900 generated using the point cloud shown in FIG. 4, using methods and systems of this disclosure.

In certain embodiments, the SR dataset may further be processed before constructing the implicit surface and performing mesh generation. For example, the above mesh generation process may provide errors or inaccuracies due to presence of inconsistent point normals (Poisson algorithm assumes point normal in the same direction for objects), large number of moving objects (hamper free space deduction), or the like; and processing the SR dataset may alleviate such errors or inaccuracies. In certain embodiments, after creation of the octree (as discussed above)—that includes both static and moving objects—the system may check for visibility violations by projections, digital differential analyzer (DDA), or the like to remove movers that occlude static objects. For example, the fusion process may be used to remove from the SR dataset 3D points corresponding to a car that was present on day 1 during mapping scan but was not present on day 2 during mapping scan. DDA is a fusion process that walks along the line of sight in the octree generated from the SR dataset to update each voxel it interacts with to add distance information from the mapping sensor (e.g., LIDAR). The updated octree may be used to remove movers included in the SR dataset based on visibility and free space constraints.

Optionally, the system may use a truncated signed distance function (TSDF) representation as an initial step to remove points or objects that are inconsistent across different mapping scans. Examples of such TSDF representation may include a KinectFusion, OpenFusion, or the like.

The systems and methods described in this disclosure may be used to generate a polygonal mesh corresponding to a mapped surface that has several novel features such as, without limitation, smaller size mesh polygons (e.g., triangles) allowing for better visualization and faster rendering, noise-free (sensor data outside of mapped surface is discarded), watertight with more accurate hole filling, free of moving objects, does not include cracks, etc. Furthermore, the mesh representation of the current disclosure is resilient to noise and noisy sensor data such as bad laser reflections do not pose a threat to the process of mesh generation.

The system may use 312 such mesh representation for navigating an autonomous vehicle. The mesh representation may be used in many applications such as, without limitation, in the navigation of autonomous vehicles, localization of an autonomous vehicle, detection of objects by the autonomous vehicle, or the like. For example, navigation of autonomous vehicles requires estimating traversability and associated cost functions of the ground surface it is traveling on. The accurate and high resolution mesh representation of the current disclosure may be used by the autonomous vehicle to, for example, avoid puddles, obstacles, vegetation, etc. on the ground surface. The mesh representation may also be used to estimate the position of autonomous vehicles with respect to other surfaces in a map (e.g., buildings or other objects). It should be noted that while the current disclosure describes surface reconstruction for a ground surface and for navigating a vehicle, it is not so limiting. The methods and systems of this disclosure may be used for surface reconstruction of any object and for use in other applications such as augmented reality, virtual reality, or the like.

Figure 10:
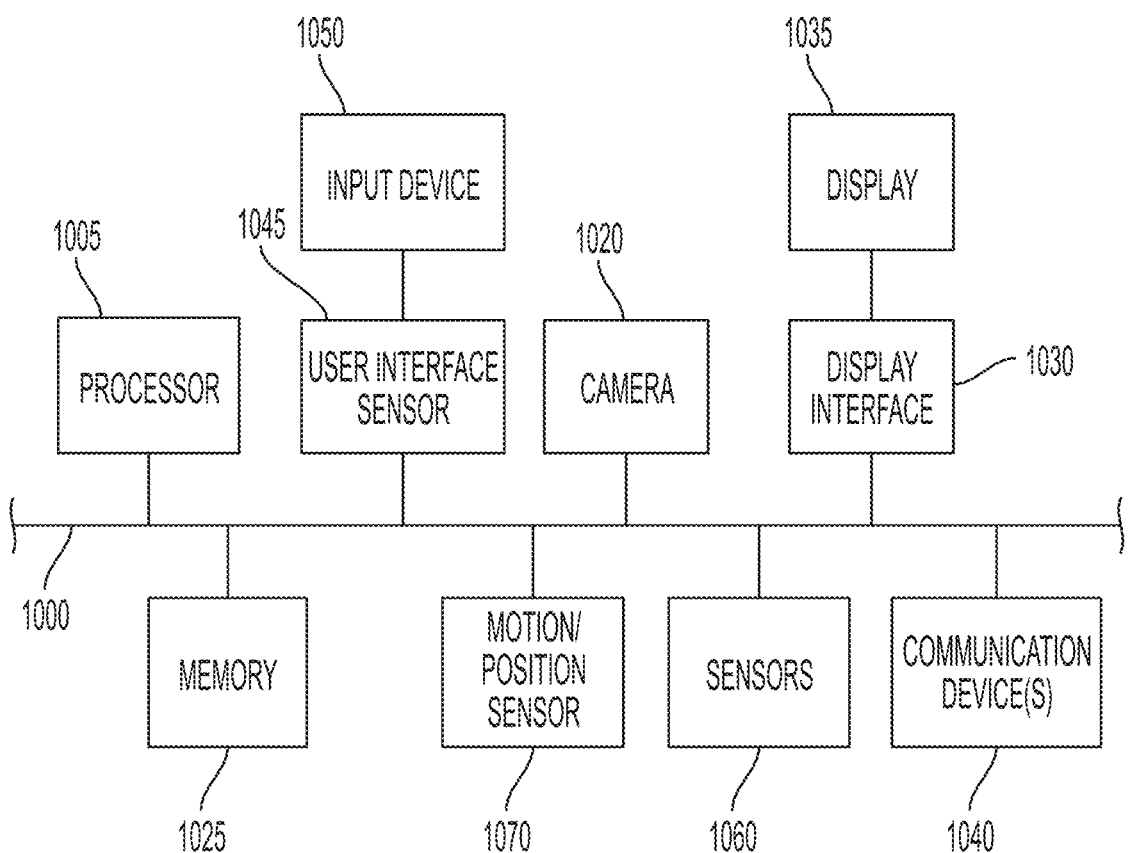
FIG. 10 is a block diagram of elements of a computing device on which the various systems and methods in this document could be implemented.

FIG. 10 depicts an example of internal hardware that may be included in any of the electronic components of the system, such as the controller (or components of the controller) of the autonomous vehicle, the control system, servers etc. described above. An electrical bus 1000 serves as an information highway interconnecting the other illustrated components of the hardware. Processor 1005 is a central processing device of the system, configured to perform calculations and logic operations required to execute programming instructions. As used in this document and in the claims, the terms "processor" and "processing device" may refer to a single processor or any number of processors in a set of processors that collectively perform a set of operations, such as a central processing unit (CPU), a graphics processing unit (GPU), a remote server, or a combination of these. Read only memory (ROM), random access memory (RAM), flash memory, hard drives and other devices capable of storing electronic data constitute examples of memory devices 1025. A memory device may include a single device or a collection of devices across which data and/or instructions are stored. Various embodiments of the invention may include a computer-readable medium containing programming instructions that are configured to cause one or more processors to perform the functions described in the context of the previous figures.

An optional display interface 1030 may permit information from the bus 1000 to be displayed on a display device 1035 in visual, graphic or alphanumeric format. An audio interface and audio output (such as a speaker) also may be provided. Communication with external devices may occur using various communication devices 1040 such as a wireless antenna, an RFID tag and/or short-range or near-field communication transceiver, each of which may optionally communicatively connect with other components of the device via one or more communication system. The communication device(s) 1040 may be configured to be communicatively connected to a communications network, such as the Internet, a local area network or a cellular telephone data network.

The hardware may also include a user interface sensor 1045 that allows for receipt of data from input devices 1050 such as a keyboard, a mouse, a joystick, a touchscreen, a touch pad, a remote control, a pointing device and/or microphone. Digital image frames also may be received from a camera 1020 that can capture video and/or still images. The system also may receive data from a motion and/or position sensor 1070 such as an accelerometer, gyroscope or inertial measurement unit. The system also may receive data from sensors such as LiDAR system 1060 such as that described earlier in this document.

The above-disclosed features and functions, as well as alternatives, may be combined into many other different systems or applications. Various components may be implemented in hardware or software or embedded software. Various presently unforeseen or unanticipated alternatives, modifications, variations or improvements may be made by those skilled in the art, each of which is also intended to be encompassed by the disclosed embodiments.

It should be noted that while the training of the neural network model and using the trained model in this disclosure is described with respect to autonomous vehicles and objects in the environments of the autonomous vehicles, the disclosure is not so limiting. The rolling horizon training methods described above may be used for training neural networks for use in other scenarios that are constrained by inertial parameters that represent short-term dynamics of an object. Examples may include neural network models configured for making predictions relating to movement of players and/or objects such as balls in a sports environment; or any other system or environment that is both constrained by physics and involves behavioral choice.

Terminology that is relevant to the disclosure provided above includes:

An "automated device" or "robotic device" refers to an electronic device that includes a processor, programming instructions, and one or more components that based on commands from the processor can perform at least some operations or tasks with minimal or no human intervention. For example, an automated device may perform one or more automatic functions or function sets. Examples of such operations, functions or tasks may include without, limitation, navigation, transportation, driving, delivering, loading, unloading, medical-related processes, construction-related processes, and/or the like. Example automated devices may include, without limitation, autonomous vehicles, drones and other autonomous robotic devices.

In this document, the terms "communication link" and "communication path" mean a wired or wireless path via which a first device sends communication signals to and/or receives communication signals from one or more other devices. Devices are "communicatively connected" if the devices are able to send and/or receive data via a communication link. "Electronic communication" refers to the transmission of data via one or more signals between two or more electronic devices, whether through a wired or wireless network, and whether directly or indirectly via one or more intermediary devices.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions. Examples of electronic devices include personal computers, servers, mainframes, virtual machines, containers, gaming systems, televisions, and mobile electronic devices such as smartphones, personal digital assistants, cameras, tablet computers, laptop computers, media players and the like. In a client-server arrangement, the client device and the server are each electronic devices, in which the server contains instructions and/or data that the client device accesses via one or more communications links in one or more communications networks. In a virtual machine arrangement, a server may be an electronic device, and each virtual machine or container may also be considered to be an electronic device. A client device, server device, virtual machine or container may be referred to simply as a "device" for brevity.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle. Autonomous vehicles also include vehicles in which autonomous systems augment human operation of the vehicle, such as vehicles with driver-assisted steering, speed control, braking, parking and other systems. The autonomous vehicle can be a ground-based autonomous vehicle (e.g., car, truck, bus, etc.), an air-based autonomous vehicle (e.g., airplane, drone, helicopter, or other aircraft), or other types of vehicles (e.g., watercraft).

In this document, when terms such "first" and "second" are used to modify a noun, such use is simply intended to distinguish one item from another, and is not intended to require a sequential order unless specifically stated. In addition, terms of relative position such as "vertical" and "horizontal", or "front" and "rear", when used, are intended to be relative to each other and need not be absolute, and only refer to one possible position of the device associated with those terms depending on the device's orientation.

The invention claimed is:

1. A method for generating a mesh representation of a surface comprising:
receiving a three-dimensional (3D) point cloud representing the surface;
identifying and discarding one or more outliers in the 3D point cloud to generate a filtered point cloud using a Gaussian process;
adding one or more additional points to the filtered point cloud to generate a reconstruction dataset;

using Poisson surface reconstruction to generate an implicit surface corresponding to the surface from the reconstruction dataset; and generating, using the implicit surface, a polygon mesh representation of the surface by using a fine-to-coarse hash map for building polygons at a highest resolution first followed by progressively coarser resolution polygons.

2. The method of claim 1, further comprising using the polygon mesh representation for navigating an autonomous vehicle over the surface.

3. The method of claim 1, wherein the polygon mesh representation is a triangle mesh representation.

4. The method of claim 1, wherein generating the polygon mesh representation comprises using at least one of the following: a marching cube algorithm, a marching tetrahedrons algorithm, or a Bloomenthal Polygonizer.

5. The method of claim 1, wherein generating the polygon mesh representation comprises detecting and filling holes in the polygon mesh representation by:

generating a list of edges that comprises a plurality of edges which have been used once in the polygon mesh; and building polygons starting from a first vertex in the implicit surface using the list of edges until reaching the first vertex such that each of the plurality of edges is used twice in the polygon mesh.

6. The method of claim 1, wherein identifying and discarding the one or more outliers in the 3D point cloud to generate the filtered point cloud using the Gaussian process comprises:

identifying a Gaussian surface corresponding to the 3D point cloud;

determining a mean Gaussian surface from the Gaussian surface; and identifying the one or more outliers as points in the 3D point cloud that have a standard deviation from the mean Gaussian surface that is greater than a threshold standard deviation.

7. The method of claim 1, wherein identifying and discarding the one or more outliers in the 3D point cloud to generate the filtered point cloud using the Gaussian process comprises:

identifying a Gaussian surface corresponding to the 3D point cloud;

determining a mean Gaussian surface from the Gaussian surface; and identifying the one or more outliers as points in the 3D point cloud that are located at a physical distance from the mean Gaussian surface that is greater than a threshold physical distance.

8. The method of claim 1, wherein adding the one or more additional points to the filtered point cloud to generate the reconstruction dataset comprises:

identifying one or more holes in the filtered point cloud; and adding at least one point to each of the one or more holes using a Gaussian surface corresponding to the 3D point cloud.

9. The method of claim 8, wherein identifying the one or more holes comprises:

grid-sampling a subset of points in the filtered point cloud to determine whether at least one point of the point cloud exists within a threshold distance from a sampled point; and identifying a hole proximate to the sampled point upon determining that at least one point of the point cloud does not exist within the threshold distance from the sampled point.

10. The method of claim 9, further comprising adding the sampled point to the reconstruction dataset upon determining that least one point of the point cloud exists within the threshold distance from the sampled point.

11. The method of claim 1, wherein receiving the 3D point cloud representing the surface comprises generating the 3D point cloud by mapping the surface using a mapping sensor to generate sensor data and using the sensor data for generating the 3D point cloud.

12. A system comprising:
one or more mapping sensors;
a processor; and
a non-transitory computer readable medium comprising one or more programming instructions that when executed by the processor, cause the processor to:
receive, a three-dimensional (3D) point cloud representing a surface,
identify and discard one or more outliers in the 3D point cloud to generate a filtered point cloud using a Gaussian process,
add one or more additional points to the filtered point cloud to generate a reconstruction dataset,
use Poisson surface reconstruction to generate an implicit surface corresponding to the surface from the reconstruction dataset, and
generate, using the implicit surface, a polygon mesh representation of the surface by using a fine-to-coarse hash map for building polygons at a highest resolution first followed by progressively coarser resolution polygons.

13. The system of claim 12, further comprising programming instructions that when executed by the processor, cause the processor to use the polygon mesh representation for navigating an autonomous vehicle over the surface.

14. The system of claim 12, wherein the polygon mesh representation is a triangle mesh representation.

15. The system of claim 12, wherein the instructions that cause the processor to generate the polygon mesh representation comprise instructions to generate the polygon mesh representation by using at least one of the following: a marching cube algorithm, a marching tetrahedrons algorithm, or a Bloomenthal Polygonizer.

16. The system of claim 12, wherein the instructions that cause the processor to generate the polygon mesh representation further comprise instructions to detect and fill holes in the polygon mesh representation by:

generating a list of edges that comprises a plurality of edges which have been used once in the polygon mesh; and building polygons starting from a first vertex in the implicit surface using the list of edges until reaching the first vertex such that each of the plurality of edges is used twice in the polygon mesh.

17. The system of claim 12, wherein the instructions that cause the processor to identify and discard the one or more outliers in the 3D point cloud to generate the filtered point cloud using the Gaussian process comprise instructions to:

identify a Gaussian surface corresponding to the 3D point cloud;

determine a mean Gaussian surface from the Gaussian surface; and identify the one or more outliers as points in the 3D point cloud that have a standard deviation from the mean Gaussian surface that is greater than a threshold standard deviation.

18. The system of claim 12, wherein the instructions that cause the processor to identify and discard the one or more outliers in the 3D point cloud to generate the filtered point cloud using the Gaussian process comprise instructions to:
identifying a Gaussian surface corresponding to the 3D point cloud;
determining a mean Gaussian surface from the Gaussian surface; and
identifying the one or more outliers as points in the 3D point cloud that are located at a physical distance from the mean Gaussian surface that is greater than a threshold physical distance.

19. The system of claim 12, wherein the instructions that cause the processor to add the one or more additional points to the filtered point cloud to generate the reconstruction dataset comprise instructions to:
identify one or more holes in the filtered point cloud; and
add at least one point to each of the one or more holes using a Gaussian surface corresponding to the 3D point cloud.

20. The system of claim 19, wherein the instructions that cause the processor to identify the one or more holes comprise instructions to:
grid-sample a subset of points in the filtered point cloud to determine whether at least one point of the point cloud exists within a threshold distance from a sampled point; and
identify a hole proximate to the sampled point upon determining that at least one point of the point cloud does not exist within the threshold distance from the sampled point.

21. The system of claim 20, further comprising programming instructions that when executed by the processor, cause the processor to add the sampled point to the reconstruction dataset upon determining that least one point of the point cloud exists within the threshold distance from the sampled point.

22. The system of claim 12, wherein the instructions that cause the processor to receive the 3D point cloud representing the surface comprise instructions to generate the 3D point cloud by mapping the surface using a mapping sensor to generate sensor data and using the sensor data for generating the 3D point cloud.

23. A computer program product comprising a non-transitory memory and programming instructions that are configured to cause a processor to:
receive, a three-dimensional (3D) point cloud representing a surface,
identify and discard one or more outliers in the 3D point cloud to generate a filtered point cloud using a Gaussian process,
add one or more additional points to the filtered point cloud to generate a reconstruction dataset,
use Poisson surface reconstruction to generate an implicit surface corresponding to the surface from the reconstruction dataset, and
generate, using the implicit surface, a polygon mesh representation of the surface by using a fine-to-coarse hash map for building polygons at a highest resolution first followed by progressively coarser resolution polygons.

24. The computer program product of claim 23, further comprising programming instructions that are configured to cause the processor to use the polygon mesh representation for navigating an autonomous vehicle over the surface.

25. The computer program product of claim 23, wherein the polygon mesh representation is a triangle mesh representation.

26. The computer program product of claim 23, wherein the instructions that are configured to cause the processor to generate the polygon mesh representation comprise instructions to generate the polygon mesh representation by using at least one of the following: a marching cube algorithm, a marching tetrahedrons algorithm, or a Bloomenthal Polygonizer.

27. The computer program product of claim 23, wherein the instructions that are configured to cause the processor to generate the polygon mesh representation further comprise instructions to detect and fill holes in the polygon mesh representation by:
generating a list of edges that comprises a plurality of edges which have been used once in the polygon mesh; and
building polygons starting from a first vertex in the implicit surface using the list of edges until reaching the first vertex such that each of the plurality of edges is used twice in the polygon mesh.

28. The computer program product of claim 23, wherein the instructions that are configured to cause the processor to identify and discard the one or more outliers in the 3D point cloud to generate the filtered point cloud using the Gaussian process comprise instructions to:
identify a Gaussian surface corresponding to the 3D point cloud;
determine a mean Gaussian surface from the Gaussian surface; and
identify the one or more outliers as points in the 3D point cloud that have a standard deviation from the mean Gaussian surface that is greater than a threshold standard deviation.

29. The computer program product of claim 23, wherein the instructions that are configured to cause the processor to identify and discard the one or more outliers in the 3D point cloud to generate the filtered point cloud using the Gaussian process comprise instructions to:
identifying a Gaussian surface corresponding to the 3D point cloud;
determining a mean Gaussian surface from the Gaussian surface; and
identifying the one or more outliers as points in the 3D point cloud that are located at a physical distance from the mean Gaussian surface that is greater than a threshold physical distance.

30. The computer program product of claim 23, wherein the instructions that are configured to cause the processor to add the one or more additional points to the filtered point cloud to generate the reconstruction dataset comprise instructions to:
identify one or more holes in the filtered point cloud; and
add at least one point to each of the one or more holes using a Gaussian surface corresponding to the 3D point cloud.

31. The computer program product of claim 30, wherein the instructions that are configured to cause the processor to identify the one or more holes comprise instructions to:
grid-sample a subset of points in the filtered point cloud to determine whether at least one point of the point cloud exists within a threshold distance from a sampled point; and identify a hole proximate to the sampled point upon determining that at least one point of the point cloud does not exist within the threshold distance from the sampled point.

32. The computer program product of claim 31, further comprising programming instructions that are configured to cause the processor to add the sampled point to the reconstruction dataset upon determining that least one point of the point cloud exists within the threshold distance from the sampled point.

33. The computer program product of claim 23, wherein the instructions that are configured to cause the processor to receive the 3D point cloud representing the surface comprise instructions to generate the 3D point cloud by mapping the surface using a mapping sensor to generate sensor data and using the sensor data for generating the 3D point cloud.

* * * * *